(12) United States Patent
James

(10) Patent No.: US 10,952,443 B2
(45) Date of Patent: Mar. 23, 2021

(54) PORTABLE CONTROLLED ATMOSPHERIC STUNNING DEVICE

(71) Applicant: Donald James, Warsaw, NC (US)

(72) Inventor: Donald James, Warsaw, NC (US)

(73) Assignee: Coastal Plains Agri-Systems, LLC, Warsaw, NC (US)

(*) Notice: Subject to any disclaimer, the term of this patent is extended or adjusted under 35 U.S.C. 154(b) by 0 days.

(21) Appl. No.: 16/674,761

(22) Filed: Nov. 5, 2019

(65) Prior Publication Data

US 2020/0138047 A1 May 7, 2020

Related U.S. Application Data

(60) Provisional application No. 62/755,819, filed on Nov. 5, 2018.

(51) Int. Cl.
*A22B 3/00* (2006.01)

(52) U.S. Cl.
CPC .................... *A22B 3/005* (2013.01)

(58) Field of Classification Search
CPC .. A22B 3/00; A22B 3/005; A22B 3/04; A22B 3/086
USPC .................... 452/52, 54, 57, 60, 66
See application file for complete search history.

(56) References Cited

U.S. PATENT DOCUMENTS

| 3,356,087 | A | 12/1967 | Guttman |
| 5,435,776 | A | 7/1995 | Owen et al. |
| 5,487,699 | A * | 1/1996 | Tyrrell .................... A22B 3/00 452/66 |
| 6,056,637 | A | 5/2000 | Freeland et al. |
| 7,341,023 | B2 * | 3/2008 | Caplette ................. A22B 3/00 119/420 |
| 7,717,773 | B2 | 5/2010 | Woodford et al. |
| 8,323,080 | B2 | 12/2012 | Lang et al. |

(Continued)

FOREIGN PATENT DOCUMENTS

| EP | 1915909 A1 | 4/2008 |
| WO | 1999051103 A1 | 10/1999 |

OTHER PUBLICATIONS

Raj, "Poultry Stunning and Slaughter Seminar", by United Poultry Concerns, retrieved Feb. 3, 2020 at https://www.upc-online.org/slaughter/10505drraj.htm, Jan. 5, 2005.

(Continued)

*Primary Examiner* — Richard T Price, Jr.
(74) *Attorney, Agent, or Firm* — Shawn Gordon, Esq.; Dunkiel Saunder Elliott Raubvogel & Hand, PLLC

(57) ABSTRACT

A portable system for stunning an animal is provided that includes a hood into which the animal's head is inserted and then is filled with a gas, such as carbon dioxide. The hood includes a gasket or covering with a slit on one end, which allows the hood to be placed over the head of the animal by a user while containing much of the carbon dioxide gas. The hood includes a handle and may have a trigger or other mechanism to control the flow of carbon dioxide gas, which is contained in a tank strapped to a user and connected to the hood via a hose or tubing. In this way, the system allows animals to be humanely stunned or euthanized individually with carbon dioxide gas using a portable system that is carried and controlled by an individual user.

17 Claims, 5 Drawing Sheets

(56) References Cited

U.S. PATENT DOCUMENTS

| | | |
|---|---|---|
| 9,017,152 B2 | 4/2015 | Zanotti |
| 9,107,423 B1 | 4/2015 | Moyle |
| 9,826,745 B2 | 11/2017 | Thulin et al. |
| 2005/0181719 A1 | 8/2005 | Taylor et al. |
| 2008/0302309 A1 | 12/2008 | Herman |
| 2013/0309953 A1* | 11/2013 | Van Stuijvenberg .... A22B 3/12 452/58 |
| 2016/0044909 A1* | 2/2016 | Lampe ................ B05B 12/002 47/1.5 |
| 2017/0119000 A1 | 5/2017 | Peters |
| 2020/0229452 A1* | 7/2020 | Brubaker ............... A22B 3/005 |

OTHER PUBLICATIONS

Webster, "A mobile modified-atmosphere killing system for small-flock depopulation", Journal of Applied Poultry Research, vol. 21, Issue 1, Mar. 1, 2012 etrieved on Feb. 3, 2020 at https://www.sciencedirect.com/science/article/pii/S1056617119306002, Mar. 2012, 131-144.

* cited by examiner

PORTABLE CONTROLLED ATMOSPHERIC STUNNING DEVICE

RELATED APPLICATION DATA

This application claims the benefit of U.S. Provisional Application No. 62/755,819, titled "Portable Controlled Atmospheric Stunning Device" and filed on Nov. 5, 2018, which is incorporated herein in its entirety.

FIELD OF THE INVENTION

The present invention generally relates to devices for stunning or euthanizing livestock. In particular, the present invention is directed to a Portable Controlled Atmospheric Stunning Device.

BACKGROUND

There are many techniques for euthanizing animals, including domesticated animals, other livestock, and pests. Some of these techniques include the use of a gas, such as carbon dioxide, to cause the animals to become unconscious and/or euthanized. This is typically accomplished by placing a group of animals into a large chamber and filling it with carbon dioxide gas. There is a need for an improved technique that uses a gas.

SUMMARY OF THE DISCLOSURE

In an embodiment, a portable system for stunning an animal is provided that includes a canister containing carbon dioxide gas, the canister sized to be attached to a user, a hose having a first end and a second end, the hose being connected at the first end to the canister, and a hand-held hood connected to the hose at the second end of the hose, the hood including a handle, a chamber sized and configured to accommodate a head of the animal, an on/off switch, a closed end, an open end, and a flexible gasket substantially covering the open end. Upon actuation of the on/off switch, carbon dioxide gas is released into the chamber.

In an embodiment, a system for stunning an animal is provided that includes a canister for holding a gas that is sized to be carried by an operator of the system, a hose having a first end and a second end, the nose being connected at the first end to the canister, and a hand-held hood connected to the hose at the second end of the hose. The hand-held hood includes a handle, a chamber sized and configured to accommodate a head of the animal, an on/off switch, a closed end, an open end, and a flexible gasket substantially covering the open end. The flexible gasket includes a slit for allowing passage of the head of the animal into the chamber while allowing a sufficient amount of the gas to be retained in the chamber to stun the animal.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A portable device of the present invention includes a hood encompassing a chamber with an opening on one end. The opening is covered by a flexible gasket with a slit. The chamber is connected to a carbon dioxide source (e.g., a canister worn on an operator's belt), which can be used to fill the chamber by an actuator for regulating the flow of the gas. In operation, the head of the animal is inserted through the slit into the chamber and carbon dioxide gas is directed into the chamber.

A portable stunning system for animals is provided that includes a hand-held chamber or hood into which an animal's head is inserted and then a gas, such as carbon dioxide, flows into the chamber. As used herein, "portable" means that the system can be carried and used by an individual operator without the need to use a transportation device or cart, and "hand-held" means the hood can be held in and manipulated by one hand of an average adult. The hood includes a flexible gasket or covering with a slit on one end, which allows the head of an animal to be placed into the hood while much of the carbon dioxide gas is still retained in the chamber. The hood includes a handle and may have a trigger or other mechanism to control the flow of carbon dioxide gas, which is stored in a tank strapped to the operator and connected to the hood via a hose or tubing. In this way, the system allows animals to be humanely stunned or euthanized individually with carbon dioxide gas using a hand-held, portable system that can be carried and controlled by an individual operator.

Figure 1:
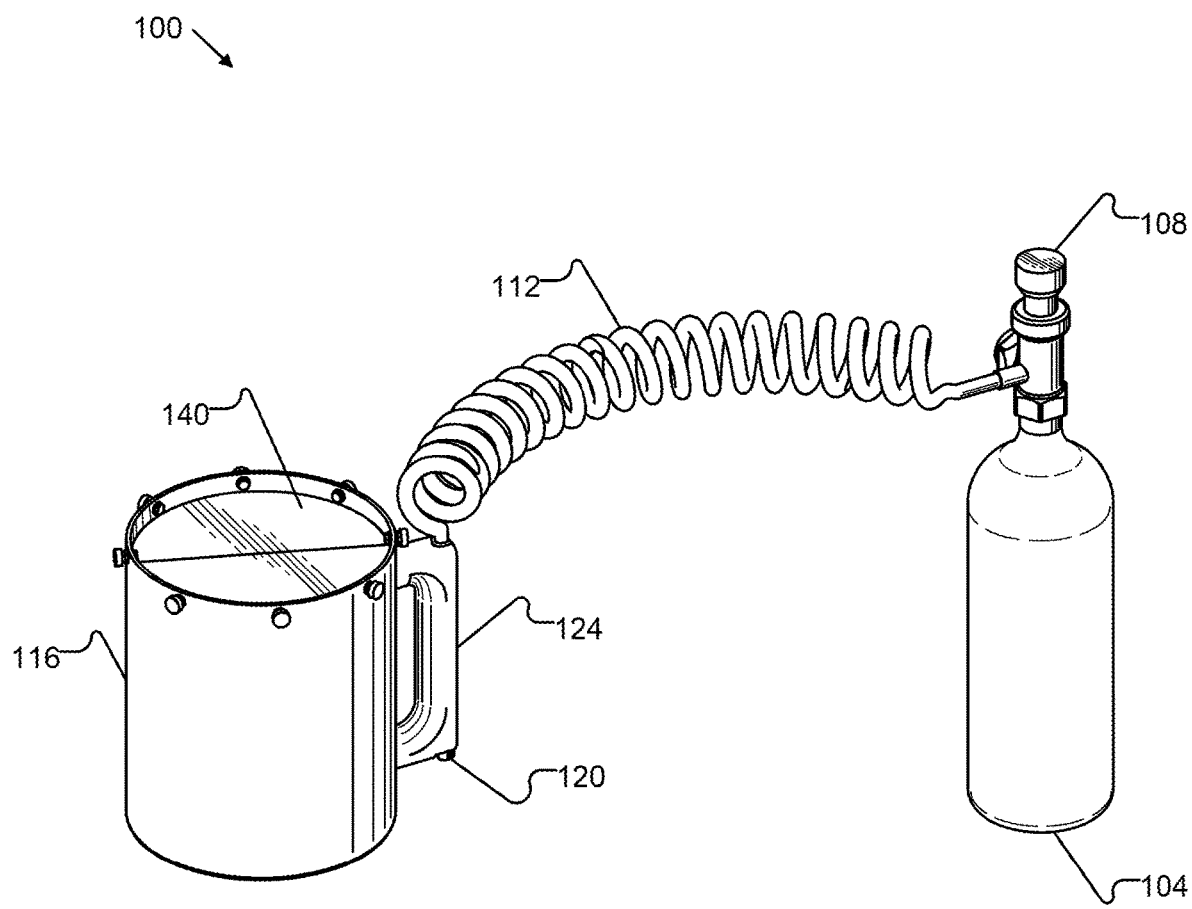
FIG. 1 shows a system for stunning animals in accordance with an embodiment of the present invention.
Figure 2:
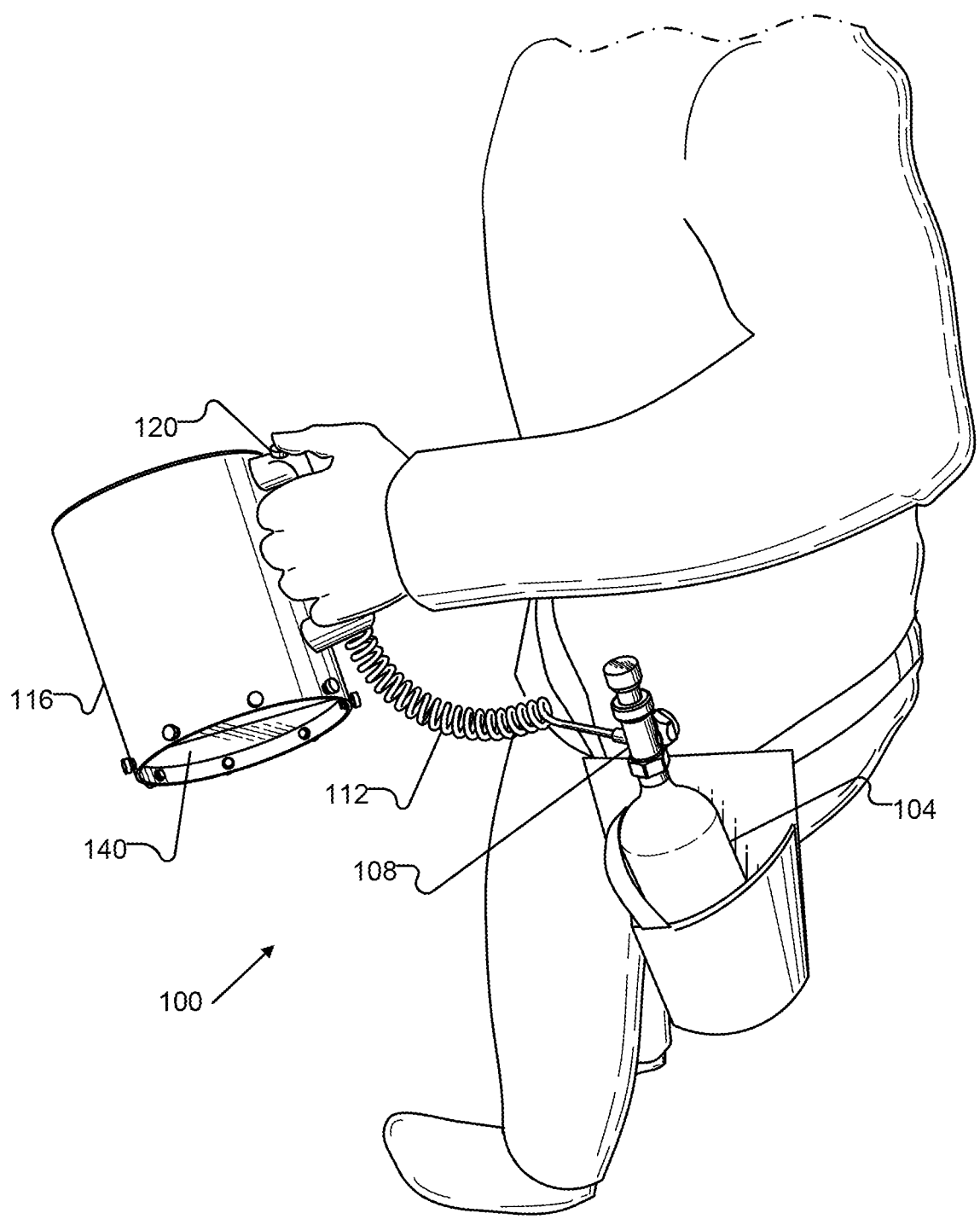
FIG. 2 is another view of the system shown in FIG. 1.

Turning to the figures, and in particular to FIGS. 1-2, an exemplary portable animal stunning system 100 includes a canister 104 for storing carbon dioxide gas, a regulator 108 connected to the canister 104, a hose 112, a hood 116, and an open/closed or on/off switch 120 for controlling the flow of gas into hood 116. Hood 116 is sized and shaped generally to accommodate the head of the animal to be stunned, such as the head of a chicken or turkey.

As shown in FIGS. 3-6, hood 116 may include a handle 124, a closed end 128, an open end 132, an exit port 136, an input port 138, and a flexible gasket 140. Preferably, exit port 136 leads to a passageway into and through handle 124, which preferably includes input port 138 on a lower portion of handle 124 where hose 112 is connected. In this way, hose 112 does not interfere with a user's grip on handle 124 and on/off switch 120 may be conveniently located on handle 124 where a user's thumb can readily engage it, although it will be understood that other arrangements are possible.

Figure 3:
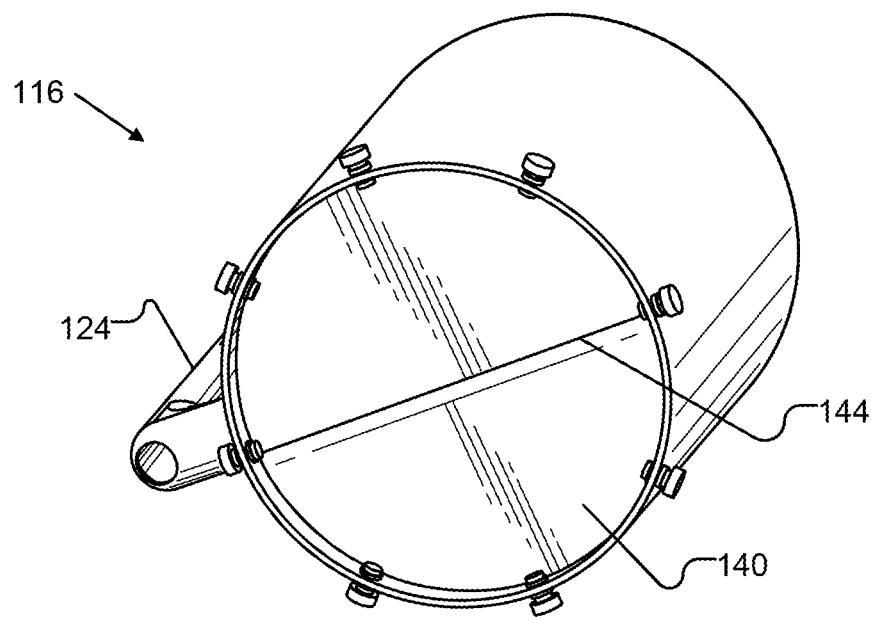
FIG. 3 is a perspective view of a hood in accordance with an embodiment of the present invention.
Figure 4:
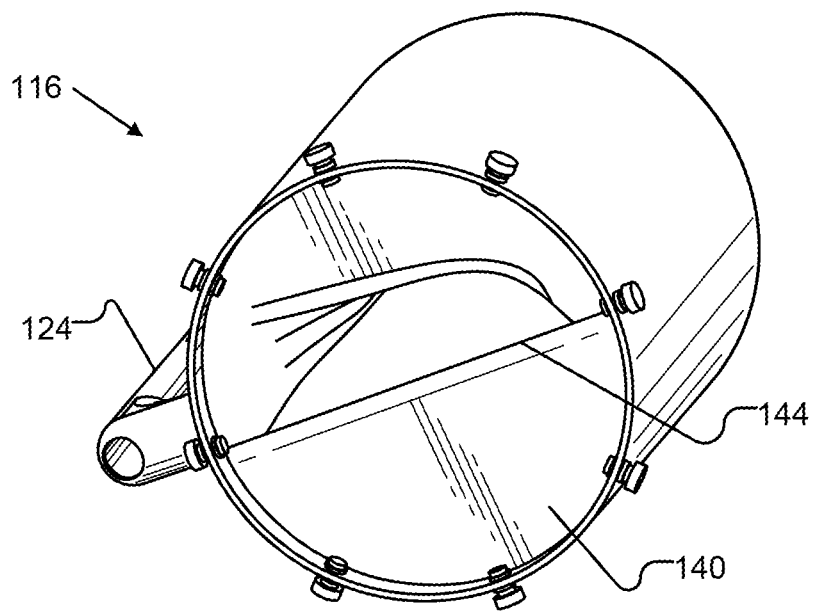
FIG. 4 is another view of the hood of FIG. 3 with an object inserted into the chamber.
Figure 5:
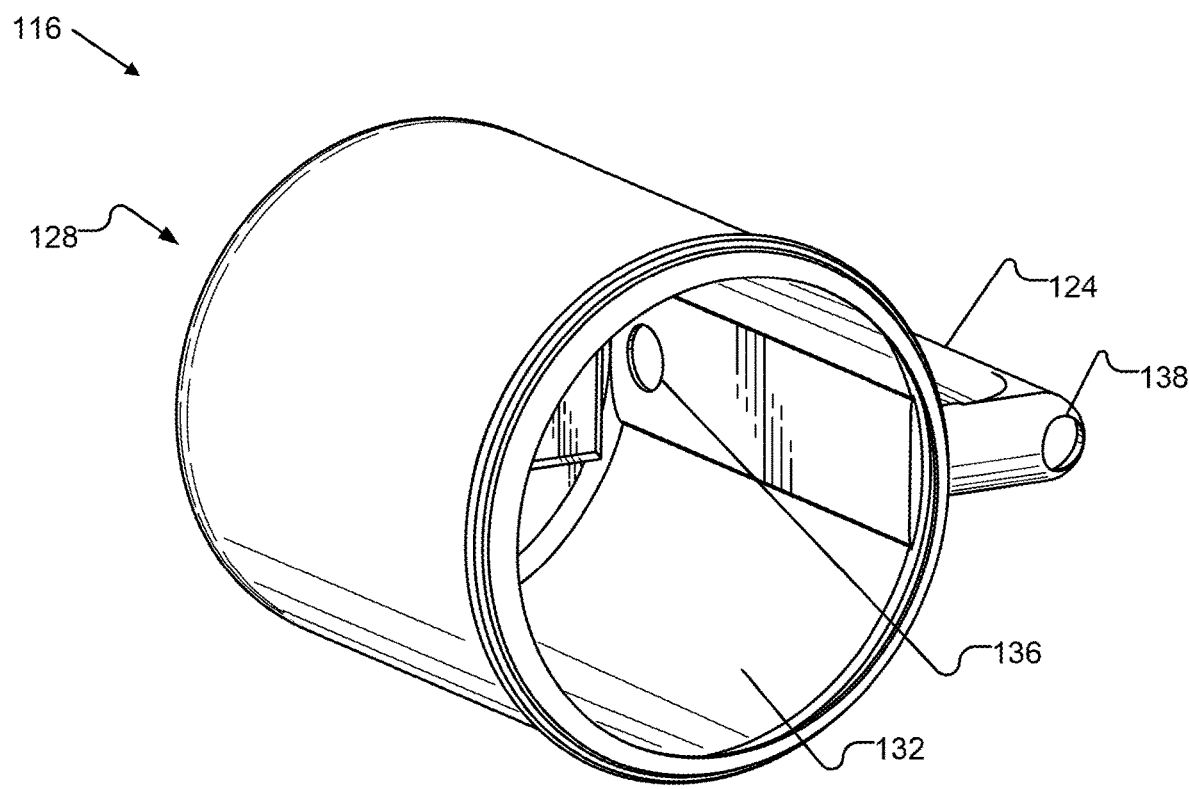
FIG. 5 is a perspective view of a portion of a hood without a gasket in accordance with an embodiment of the present invention.
Figure 6:
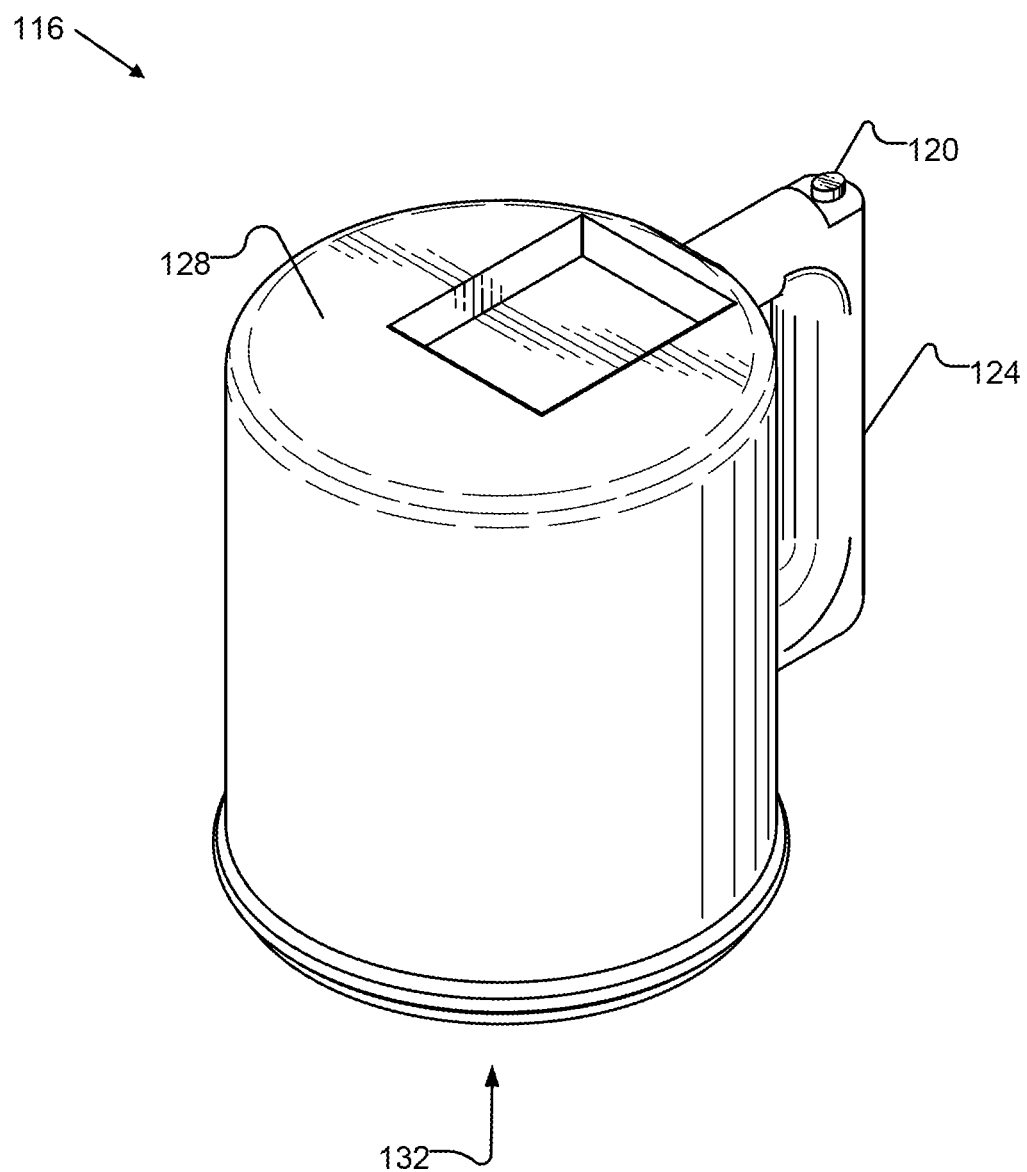
FIG. 6 is another perspective view of the portion of the hood shown in FIG. 5.

Open end 132 of hood 116 is covered by flexible gasket 140, which, as can be seen in FIGS. 3-4, includes a slit 144 or other substantially re-closeable opening (shown partially spread open in FIG. 4). Slit 144 allows hood 116 to be placed over an object, such as the head of an animal, such that flexible gasket 140 serves to retain much of the inputted carbon dioxide gas within the chamber of hood 116 because the edges of slit 144 will substantially rebound around the neck of the animal. In a preferred embodiment, hood 116 is cylindrical and has a diameter of not more than about 6 inches such that it is easy to wield yet accommodates the head of a turkey or chicken, for example.

In operation, an operator attaches canister 104 to a belt or otherwise carries canister 104. Regulator 108 is actuated to allow for the flow of gas out of canister 104 and the operator grasps handle 124 with one hand. The user then places open end 132 of hood 116 over the head of an animal to be stunned, with the animal's head passing into the chamber through gasket 140 via slit 144, which then tends to form a rough seal around the neck of the animal. The operator then activates on/off switch 120, which causes the chamber of hood 116 to substantially be filled with carbon dioxide gas. In a preferred embodiment under typical conditions, about 30 seconds is required to render a small animal unconscious, with an additional 20-30 seconds required before such an animal would be euthanized depending on the animal (e.g., a turkey). Poultry birds, for example, typically do not struggle under these circumstances, making the process simpler for the user and resulting in a calmer barn, cage, or other environment where the animals are housed. Once the process is completed, on/off switch 120 is deactivated to stop the flow of carbon dioxide gas into the chamber of hood 116, and hood 116 is removed from over the head of the animal. The operator can then move on to the next animal without having to move the animals to a new location or to relocate heavy equipment.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A portable system for stunning an animal comprising:
   a canister containing carbon dioxide gas, the canister sized to be attached to a user;
   a hose having a first end and a second end, the hose being connected at the first end to the canister; and
   a hand-held hood connected to the hose at the second end of the hose, the hood including a handle, a chamber sized and configured to accommodate a head of the animal, an on/off switch, a closed end, an open end, and a flexible gasket substantially covering the open end, wherein upon actuation of the on/off switch carbon dioxide gas is released into the chamber.

2. The system according to claim 1, wherein the flexible gasket includes a slit.

3. The system according to claim 1, wherein the on/off switch is located on the handle.

4. The system according to claim 3, wherein the handle includes an exit port, an input port, and a passageway, wherein the exit port leads to the chamber, and wherein the input port is connected to the second end of the hose.

5. The system according to claim 1, wherein the hood is cylindrical.

6. The system according to claim 5, wherein the hood has a diameter of six inches or less.

7. The system according to claim 1, wherein the hood has an upper portion and a bottom portion and wherein the open end is on the bottom portion.

8. The system according to claim 7, wherein the handle has a top portion and the on/off switch is on the top portion.

9. A system for stunning an animal comprising:
   a canister for holding a gas, the canister sized to be carried by a user;
   a hose having a first end and a second end, the hose being connected at the first end to the canister; and
   a hand-held hood connected to the hose at the second end of the hose, the hood including a handle, a chamber sized and configured to accommodate a head of the animal, an on/off switch, a closed end, an open end, and a flexible gasket substantially covering the open end, wherein the flexible gasket includes a slit for allowing passage of the head of the animal into the chamber while allowing a sufficient amount of the gas to be retained in the chamber to stun the animal.

10. The system according to claim 9, wherein the gas is carbon dioxide gas.

11. The system according to claim 10, wherein the handle includes an exit port, an input port, and a passageway, wherein the exit port leads to the chamber, and wherein the input port is connected to the second end of the hose such that the gas flows through the handle to reach the chamber.

12. A hand-held hood for stunning an animal, the hood comprising:
   a chamber sized and configured to accommodate a head of the animal;
   a handle, the handle including an exit port leading into the chamber, an input port configured to connect to a source of gas, and a passageway in the handle between the input port and the exit port;
   an on/off switch on the handle for controlling a flow of gas into the chamber;
   a closed end defining a portion of the chamber;
   an open end; and
   a flexible gasket substantially covering the open end.

13. The hand-held hood according to claim 12, wherein the flexible gasket includes a slit.

14. The hand-held hood according to claim 12, wherein the hood is cylindrical.

15. The hand-held hood according to claim 14, wherein the hood has a diameter of six inches or less.

16. The hand-held hood according to claim 15, wherein the hood has an upper portion and a bottom portion and wherein the open end is on the bottom portion.

17. The hand-held hood according to claim 16, wherein the handle has a top portion and the on/off switch is on the top portion.

* * * * *